Dec. 12, 1939.   M. FUKUHARA   2,183,349
VEHICLE SIGNAL AND MEANS FOR OPERATION
Filed Aug. 22, 1938   3 Sheets-Sheet 1
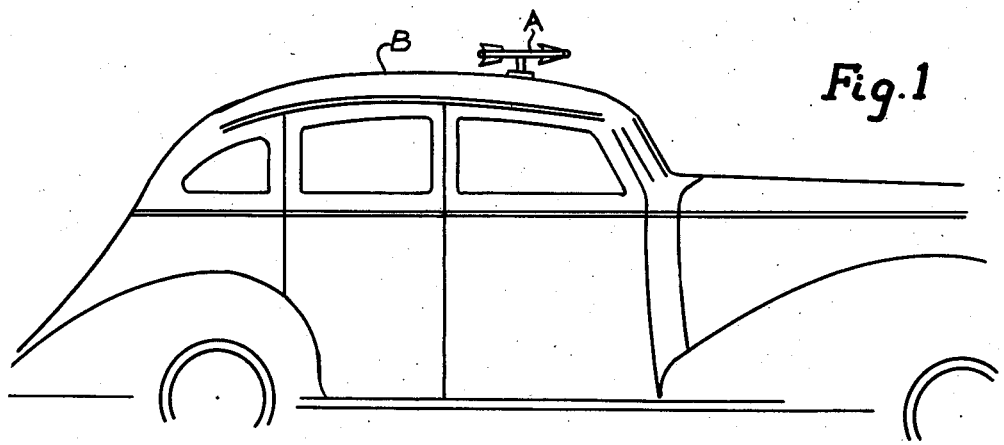
Fig.1
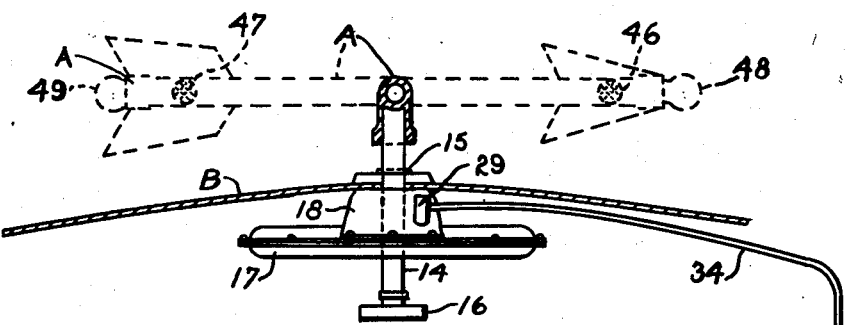
Fig.2
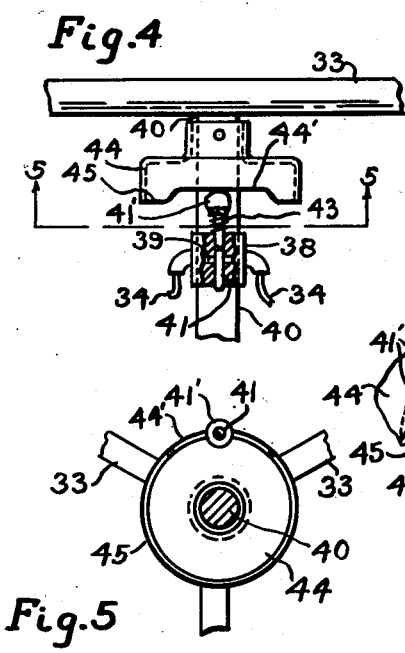
Fig.4
Fig.5
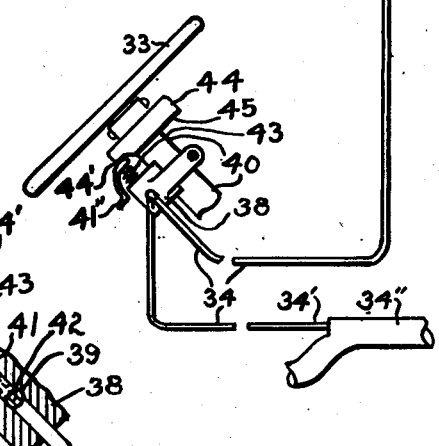
Fig.3
INVENTOR.
MITSUO FUKUHARA
BY G. Ward Kemp
ATTORNEY.

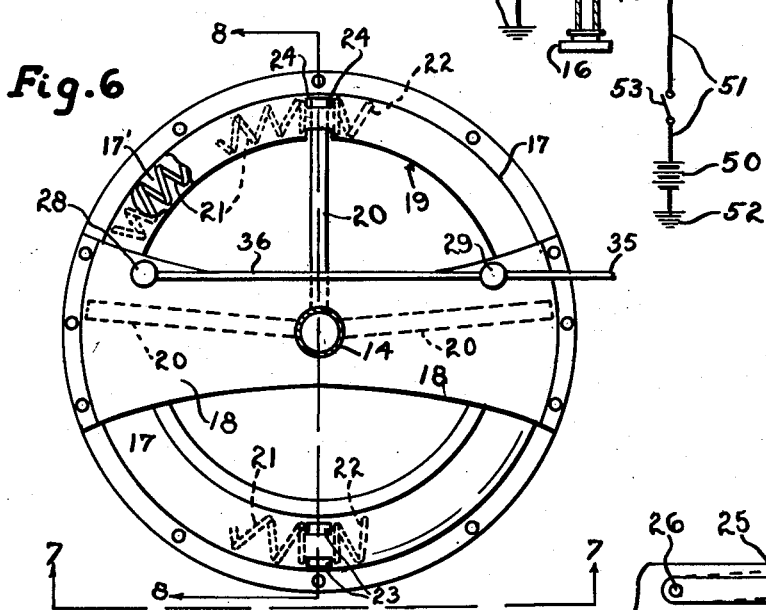

Dec. 12, 1939.   M. FUKUHARA   2,183,349
VEHICLE SIGNAL AND MEANS FOR OPERATION
Filed Aug. 22, 1938   3 Sheets-Sheet 3
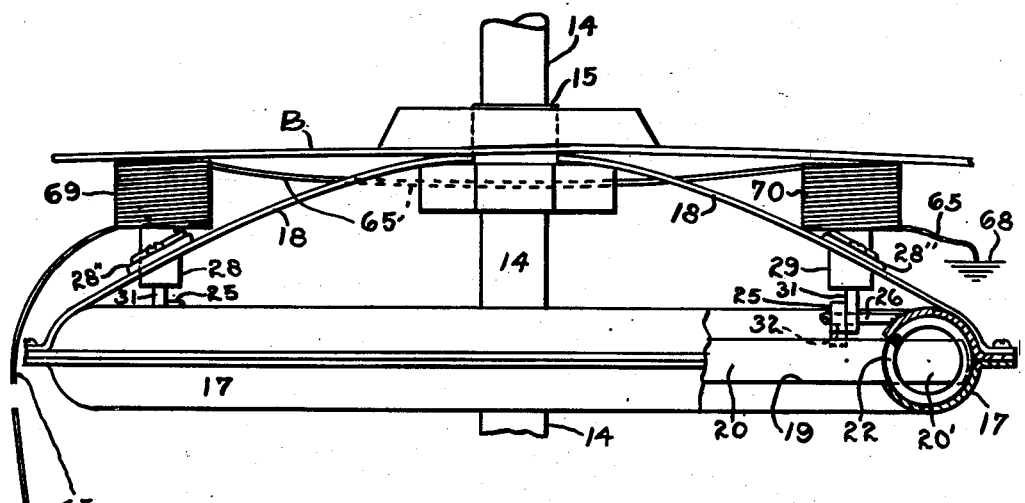
Fig.11
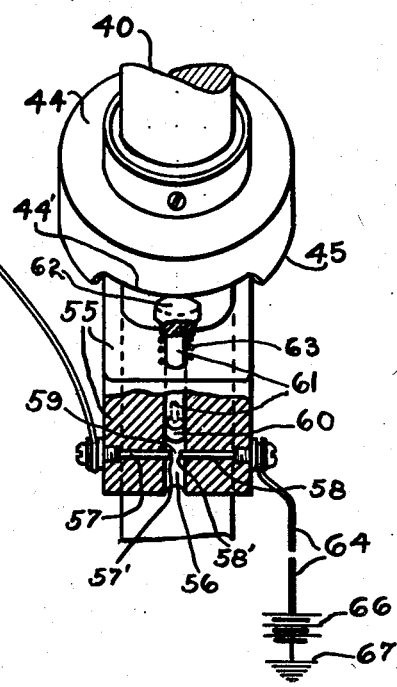
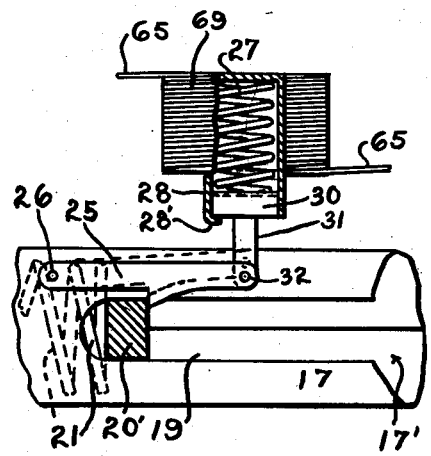
Fig.12
INVENTOR.
MITSUO FUKUHARA
BY G. Ward Kemp
ATTORNEY.

Patented Dec. 12, 1939

2,183,349

UNITED STATES PATENT OFFICE 2,183,349

VEHICLE SIGNAL AND MEANS FOR OPERATION

Mitsuo Fukuhara, Tacoma, Wash.

Application August 22, 1938, Serial No. 226,060

4 Claims. (Cl. 116—39)

This invention relates to signals for automobiles and particularly to means for operating such signals.

In the use of automobiles, hereinafter generally called cars, it is necessary that a driver shall indicate in some visible manner to other drivers when he is about to turn to the right or left. Generally the extended hand in different positions is used for such signals, but the hand cannot always be well seen at night, and during inclement weather such practice is very objectionable. Many drivers also prefer to retain both hands on the steering wheel both before and while the turning is being done. Some mechanical devices have been proposed for such signals but they have not been satisfactory for various reasons; and particularly in requiring personal attention during the period while the signal is displayed and also for discontinuing the signals.

It is, therefore, an object of the invention to provide an apparatus whereby such signals may be easily and conspicuously displayed by night as well as day and in all conditions of weather. A further object is to provide a mechanical signal which may be first displayed manually before a turn and which will continue to be displayed until the car has been turned to either side; and which will thereupon automatically revert to neutral or forward position.

A particular object is to provide a direction arrow, pivotally connected on top of a car with a handle, within the car for turning the same toward either side, with means for sustaining the arrow in such side directions and means for automatically returning such arrow to a forward position as soon as the car has been turned to either side; together with means for illuminating the ends of the arrow.

With these and other objects hereinafter shown I have illustratively exemplified my inventions by the accompanying drawings of which:

Figure 1 is a side elevation of a car with an arrow thereon pointed forward. Figure 2 shows a side elevation of a car top with the arrow pointed forward and a diagrammatic view of a tubular connection between the suction chamber of the car and a latch for releasing the arrow from side positions by suction. Figure 3 is an enlarged fragmentary view of a control valve in open condition with a suction chamber. Figure 4 is an enlarged fragmentary view of the parts shown in Fig. 3, showing the valve closed. Figure 5 is a fragmentary view of parts shown in Fig. 4, taken on line 5—5 of Fig. 4. Figure 6 is an enlarged fragmentary view of a top plan of a tubular ring with means for operating the arrow. Figure 7 is a rear view of Fig. 6, taken on line 7—7 of Fig. 6, with parts in section. Figure 8 is a side elevational view taken on line 8—8 of Fig. 6, with parts in section. Figure 9 is an enlarged fragmentary side view of a portion of the tubular ring and a plunger for releasing a latch. Figure 10 is a diagrammatic view of wires for illuminating bulbs on the ends of the arrow. Figure 11 is an enlarged rear view of the principal parts of the device in relative position showing an alternate plan for releasing the arrow from side positions by means of electric current from the car battery, with parts broken away. Figure 12 is an enlarged fragmentary side view of one of the latches and pistons with an electromagnet for lifting the latch.

Like characters on the different figures represent like parts.

A, represents any bar signal mounted on a car B, preferably in form of an arrow which is mounted on a post 14, in position to be observed from behind the car. Said post is pivotally positioned through a sleeve 15, through the top of a car and on the lower end thereof is a handle 16, in form and position to be readily turned by the driver and to indicate the position of the arrow.

Below the car top is mounted a tubular ring 17, with a chamber 17' on any suitable bracket 18, through the center of which the post is rotatably mounted. Around the front portion of the inner edge of the ring, a slot 19, is provided, and the outer end of an arm 20, projected from the post is slidably disposed through the slot and partly across the chamber. The inner end of this arm extends horizontally from the post, and when the post is turned the outer end 20' of the arm 20 swings around within said chamber. Normally while the car is being driven the arrow is positioned lengthwise of the car with the point forward. The arm is mounted in line beneath the arrow with the outer end thereof in the same direction as the point of the arrow. Coil springs 21 and 22 are movably disposed within the chamber with the front ends one on each side of the said point 20' of the arm respectively. Behind the rear ends of the springs are lugs 23, which block the spring from moving beyond such lugs when the arm is swung to either side, whereby the springs may be compressed. Other suitable lugs 24, prevent the front ends of the springs from moving beyond the central portion of the front of the ring adjacent the point of the arm. The arm is thus normally sustained between two springs in a forward position and when turned to either side, one of the springs is compressed thereby.

In order to retain the arm in such turned directions until the car has been also turned, I provide suitable latches or catches 25, at the outward lines of travel of the arm. These latches or catches are connected inside the ring chamber by pivot pins 26, and are normally pressed downward to a predetermined position for retaining the arm by weak coil springs 27, which are movably disposed in the upper portions of the cylinders 28 and 29. Below these springs, within the cylinders, pistons or plungers 30, are slidably disposed and carry rods 31 extended beneath same which are connected at the lower ends by pivots 32 to the front or free ends of said latches.

When the arm has been latched on either side, the arrow continues to point toward that side until the latches are raised and the arm is released therefrom. For the purpose of releasing such latches, I provide automatic means operated by the steering wheel 33, when it is turned to a degree to either side sufficiently to direct the car to such side.

My preferred method for releasing such latches is to utilize a suction from the suction chamber of the car motor. To accomplish this result, I connect the lower end 34' of a small flexible tube 34 into the suction chamber 34", adjacent the ordinary motor cylinders; and carry the other end 35, and an extension 36, up to and connecting the same through ports 37 of the side cylinders 28 and 29. The suction from the motor thus draws the plunger 30, upward and sustains the latches above the path of the arm when the engine is in operation. To permit the springs 27 to normally maintain the latches in lowered position for retaining the arm, any tubular valve block 38, with a cross port 39, is attached to a steering post 40, and a valve stem 41 is slidably positioned through the block. This stem is provided with a neck 42, which is normally maintained above the cross post by a spring 43, and when so raised the suction is cut off from the tube 34. Above the stem 41 and attached to the steering post is a collar 44, in slidable relation with the stem. The lower face of this collar is provided with an upraised portion or track 44' upon which the top of the stem is normally positioned when the car is being driven forward and the suction at the same time cut off. The remainder of the lower face is extended as an eccentric or cam flange 45. When a steering wheel is turned sufficiently to turn the car to one side, this cam rides over and depresses the stem until the neck 42 is aligned with said port, whereupon the suction power is conveyed through the port and the tubes and the outer cylinders whereupon the arm is unlatched by such suction and the arm and arrow are returned to the original forward positions by the springs 21 and 22. An auxiliary hand lever 41" is extended from the top of the stem for manual depression of the valve stems in cases where the wheel 33 and the car are not necessarily turned sufficiently to bring the cam in contact with the top of such stem.

In the use of some cars it is preferable to use electric current from the car battery to lift the latches and release the arm from either side position respectively. For this operation I attach to the steering post an insulation block 55, provided with a perpendicular well 56. Pins 57 and 58 are slidably projected into the well with a space 59 between the points 57' and 58' thereof. Above these points a connecting plate 60 is attached to the lower end of a non-conducting stem 61, which is slidably positioned in the well. The top of the stem or head 62 is normally upraised by a spring 63 into slidable relation with the lower face of said collar 44.

When the car is driven straightforward and the upper face 44' of the collar permits the spring 63 to maintain the stem uplifted and the plate thereon is separated from contact to the points of the pins and no current passes. When the wheel is turned sufficiently to turn the car to either side the cam 45 depresses the stem and plate against the pins and thereby completes an electric circuit therethrough from wires 64 and 65 from the battery with ground 67 and 68. The wire 65 or other fine wires are wrapped around each of the iron cylinders 28 and 29, to form magnetic spools 69 and 70 and thereby create electro magnets of such cylinders. The plungers 30 are also preferably of iron and when the electric current is passed through the magnet from the battery the plungers are raised by the electric or magnetic force above.

Near the point of the arrow is placed a reflection disc 46, preferably green in color, and near the other end a similar disc is positioned, preferably red in color; for illumination from the lights of the following car in the night time. In order to assure an illumination of the arrow where uneven ground might prevent the light of the following car from shining on the reflectors, I provide an electric connection from the battery of the car to a green bulb in the point of the arrow and a red bulb in the other end thereof. These bulbs are connected to the ordinary car battery 50 by wires 51 and grounds 52. An ordinary switch 53 is provided to enable the driver to connect electric currents for the arrow.

By the use of my device a driver may quickly turn the point of the arrow to either side to indicate his intention to so turn a car to give warning to others behind the same, and he will then have both hands free to operate the wheel. The arrow, when caught between latches on either side will remain in such side position, and continue to point toward such side positions while held by the respective latches. As soon as the wheel has been turned toward either side sufficiently to turn the car to one side the latches will be automatically raised either by the suction or electric current power and the arrow will be returned to forward position by one of the chamber springs pressing the arm forward. In some cases where the driver desires to indicate intention to stop or for other reasons, he may move the handle a short distance to and fro and so give the arrow a jiggling movement.

While I have described the device, I desire to cover my invention broadly within the scope of the claims and disclosures made.

Having described my invention I claim as new:
1. A signal for a car and means for operating the same, comprising, a cross bar at all times horizontally disposed above said car, a pivot post supporting said bar over said car, a handle on the lower end of said post within said car for manually turning said bar from a normal position lengthwise of the car to a position crosswise thereof, an arm extended horizontally from said post, a radius guide in front of said post for guiding said arm, movably mounted latches at the sides of said guide for retaining said arm and bar in two crosswise positions of said car, braces for supporting said guide, cylinders mounted over said latches and braces, pistons slidably disposed in said cylinders and connected to said latches, with means for conducting power from said car to said pistons for raising the same and for disengaging said latches from said arm at predetermined times, resilient means for returning said arm to forward position and for sustaining said bar in forward normal position when said arm is released from said latches.

2. A combined signal and operating means for a car, including a crossbar at all times horizontally disposed with said car, a supporting pivot post for said bar, means for turning said post and turning said bar thereby from a normal position lengthwise of said car to a position crosswise thereof to indicate a change of direction of travel, a side arm extended from said post, a radius guide supported in front of said post for guiding said arm, said guide being provided with oppositely positioned movably mounted catches for temporarily retaining said arm and bar in two crosswise positions of said car, means for automatically disengaging said catches from said arm when said car is turned, and resilient means for returning said arm and bar to said normal position and for retaining the same thereat.

3. A combined signal and operating means for indicating the directions of lines of travel of a car, including a rotatable post for supporting such signal, an arm projected horizontally from said post and rotatable therewith for maintaining said post and signal in predetermined positions, a chamber for guiding said arm, movably mounted catches disposed at opposite ends of said chamber for temporarily retaining said arm thereat, pistons movably mounted over said catches adapted to disengage said catches from said arm, cylinders mounted over said pistons for guiding said pistons, a tube connecting said cylinders with the suction of a car engine, a valve mounted on a steering post of said car adjacent the steering wheel thereof and adapted to coact with said tube, an eccentric collar coacting between said steering wheel and said valve for actuating the valve when said wheel is turned, with resilient means for restoring the signal to normal position.

4. A combined signal and operating means for a car, comprising, a cross bar at all times horizontally disposed on said car, a pivot post mounted through the roof of said car for supporting and turning said bar, means for manually turning said bar from normal position lengthwise of said car to two crosswise positions thereof to indicate changes of direction of travel, an arm extended horizontally from said post, a guide supported in front of said post, movably mounted catches on said guide spaced from each side of said post along said guide for temporarily retaining said arm in said crosswise position of said car, pistons for disengaging said catches from said arm, cylinders supported over said guide for said pistons, a tube for conveying suction pressure from an engine of the car against said pistons, a control valve mounted in the line of said tube adjacent a steering wheel of said car, a valve stem attached to said valve, an eccentric collar carried by said wheel adapted to depress said stem to open said valve at predetermined periods for moving said pistons, resilient means for returning said bar to normal position when said arm is disengaged from said catches.

MITSUO FUKUHARA.